(12) United States Patent
Lee et al.

(10) Patent No.: US 8,983,006 B2
(45) Date of Patent: Mar. 17, 2015

(54) ORTHOTOPE SPHERE DECODING METHOD AND APPARATUS FOR SIGNAL RECONSTRUCTION IN MULTI-INPUT MULTI-OUTPUT ANTENNA SYSTEM

(71) Applicant: Gwangju Institute of Science and Technology, Gwangju (KR)

(72) Inventors: Heung-No Lee, Gwangju (KR); Hwanchol Jang, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 0 days.

(21) Appl. No.: 13/970,774

(22) Filed: Aug. 20, 2013

(65) Prior Publication Data

US 2014/0056391 A1    Feb. 27, 2014

(30) Foreign Application Priority Data

Aug. 21, 2012 (KR) .................. 10-2012-0091394

(51) Int. Cl.
*H04L 27/08* (2006.01)
*H04L 1/00* (2006.01)
*H04L 25/03* (2006.01)

(52) U.S. Cl.
CPC ........ *H04L 1/0054* (2013.01); *H04L 25/03242* (2013.01)
USPC ............................ 375/340; 375/316; 375/324

(58) Field of Classification Search
USPC ........................................................... 375/340
See application file for complete search history.

(56) References Cited

U.S. PATENT DOCUMENTS 7,233,634 B1 * 6/2007 Hassell Sweatman et al. ............................ 375/346

* cited by examiner

*Primary Examiner* — Erin File
(74) *Attorney, Agent, or Firm* — Lowe Hauptman & Ham, LLP

(57) ABSTRACT

An orthotope sphere decoding method of a multiple antenna system is disclosed. The method includes performing tree search using a depth-first method by performing an OC-test on the nodes on which the tree search of orthotope sphere decoding will be performed and performing an SC-test on nodes passing the OC-test; and selecting a transmission symbol having a smallest PED value as a final signal as a result of the search.

10 Claims, 5 Drawing Sheets

ORTHOTOPE SPHERE DECODING METHOD AND APPARATUS FOR SIGNAL RECONSTRUCTION IN MULTI-INPUT MULTI-OUTPUT ANTENNA SYSTEM

CROSS-REFERENCE TO RELATED APPLICATION

This application claims priority to Korean Patent Application No. 10-2012-0091394 filed on 21 Aug. 2012, and all the benefits accruing therefrom under 35 U.S.C. §119, the contents of which is incorporated by reference in its entirety.

BACKGROUND

1. Technical Field

The present invention relates to an orthotope sphere decoding method for signal reconstruction in a multiple antenna system and an apparatus for the same. More particularly, the present invention relates to an orthotope sphere decoding method for signal reconstruction in a multiple antenna system and an apparatus for the same, in which a tree search is performed in the multiple antenna system using a depth-first method to detect a transmission symbol having a smallest PED value as an optimum signal by performing an OC-test on the nodes on which the tree search of orthotope sphere decoding will be performed and performing an SC-test on nodes passing the OC-test, thereby reducing complexity of decoding for signal reconstruction.

2. Description of the Related Art

As high-quality and high-speed data transmission is required in a wireless communication environment, a multiple-input and multiple-output (hereinafter, referred to as 'MIMO') system using multiple antennas is used for efficient use of limited frequencies. The MIMO system can be operated according to a space-time coding scheme or a space-division multiplexing scheme. The space-time coding scheme is a technique capable of enhancing reliability of a wireless communication system by encoding data transmitted from different antennas. The space-division multiplexing scheme is a technique which increases data transmission rates by simultaneously transmitting data independent from one another through multiple antennas.

Various techniques have been proposed to detect transmission symbols from received symbols at a receiving end when the MIMO system transmits independent symbols through multiple transmission antennas in the space-division multiplexing scheme. The maximum likelihood (ML) detection technique calculates and compares Euclidean distances for all transmittable symbol vectors in order to detect the symbols.

The ML detection technique searches for transmission symbols having a shortest Euclidean distance from a received signal for all combinations of transmittable transmission symbols. However, if the number of antennas and the scale of a modulation scheme increase, complexity of ML detection is exponentially increased, and thus it is very difficult to implement ML detection. In order to reduce the complexity of ML detection, a sphere decoding technique has been developed.

Since the sphere decoding technique calculates Euclidean distance only for a set of symbol vectors existing in a sphere having a radius that is set in an initial stage considering noise variance and channel state, it can reduce the complexity of ML detection. However, complexity of a sphere decoder varies depending upon initial radius and a method of searching for lattice vectors existing in a sphere. That is, if the initial radius is set too large, numerous lattice vectors may exist within the initial radius, and thus the sphere decoder will have a complexity almost equal to that of an ML detector. In addition, if the initial radius is too small, the sphere decoder is unable to search for an effective lattice vector. In addition, if SNR of the sphere decoder is low, the number of visiting nodes, i.e., complexity, abruptly increases when tree search is performed, and thus decoding efficiency is degraded.

BRIEF SUMMARY

It is an aspect of the present invention to provide an orthotope sphere decoding method for signal reconstruction in a multiple antenna system and an apparatus for the same, in which tree search is performed in the multiple antenna system using a depth-first method to detect a transmission symbol having a smallest PED by performing an OC-test on the nodes on which the tree search of orthotope sphere decoding will be performed and performing an SC-test on the nodes passing the OC-test, and thus the decoding is rapidly and efficiently performed.

In accordance with one aspect of the present invention, an orthotope sphere decoding method of a multiple antenna system includes: performing tree search using a depth-first method by performing an OC-test on nodes on which the tree search of orthotope sphere decoding will be performed and performing an SC-test on nodes passing the OC-test; and selecting a transmission symbol having a smallest PED value as a final signal from a result of the search.

In accordance with another aspect of the present invention, an orthotope sphere decoding apparatus of a multiple antenna system includes: a tree search unit for performing tree search in a depth-first method by performing an OC-test on nodes on which the tree search of orthotope sphere decoding will be performed and performing an SC-test on nodes passing the OC-test; and a selection unit for selecting a transmission symbol having a smallest PED value as a final signal from a result of the search.

According to the present invention, tree search is performed in the multiple antenna system in a depth-first method to detect a transmission symbol having a smallest PED value as an optimum signal by performing an OC-test on the nodes on which the tree search of orthotope sphere decoding will be performed and performing an SC-test on the nodes passing the OC-test, and thus decoding performance for signal reconstruction can be improved in the multiple antenna system by reducing the number of PED calculations.

Further, since complexity of a receiver can be reduced while maintaining performance of a maximum likelihood (ML) receiver, the high-speed data transmission function, which is an advantage of the multiple antenna system, can be further improved, and thus data transmission rates can be improved in a variety of wireless and mobile communication fields.

BRIEF DESCRIPTION OF THE DRAWINGS

The above and other aspects, features, and advantages of the present invention will become apparent from the detailed description of the following embodiments in conjunction with the accompanying drawings, in which.

DETAILED DESCRIPTION

Figure 1:
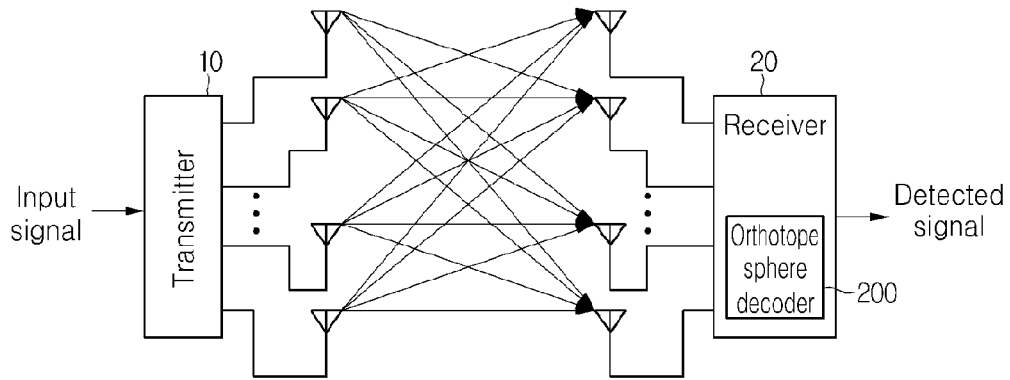
FIG. 1 is a block diagram of a multiple antenna system in accordance with one embodiment of the present invention.

Exemplary embodiments of the present invention will now be described in detail with reference to the accompanying drawings. It should be understood that the present invention is not limited to the following embodiments and may be embodied in different ways, and that the embodiments are given to provide complete disclosure of the invention and to provide thorough understanding of the invention to those skilled in the art. The scope of the invention is limited only by the accompanying claims and equivalents thereof. Like components will be denoted by like reference numerals throughout the specification.

FIG. 1 is a block diagram showing the configuration of a multiple antenna system in accordance with one embodiment of the present invention.

Referring to FIG. 1, a multiple antenna system in accordance with one embodiment of the present invention includes a transmitter 10 for transmitting independent symbols through a plurality of transmission antennas and a receiver 20 for detecting transmission symbols from reception symbols received through a plurality of reception antennas.

The transmitter 10 encodes and interleaves a bit stream corresponding to an input signal to be transmitted, and converts the bit stream in series and in parallel according to the number of antennas. Lattice symbols converted in parallel are simultaneously transmitted through multiple antennas. The receiver 20 receives the lattice type symbols transmitted from the plurality of antennas provided in the transmitter 10, detects a plurality of independent transmission symbols included in the received symbols, and outputs a detection signal. The receiver 20 includes an orthotope sphere decoder 200 for detecting the transmission symbols. The orthotope sphere decoder 200 searches for transmission symbols having a minimum Euclidean distance with respect to lattice vectors existing in a sphere having a predetermined initial radius.

Figure 2:
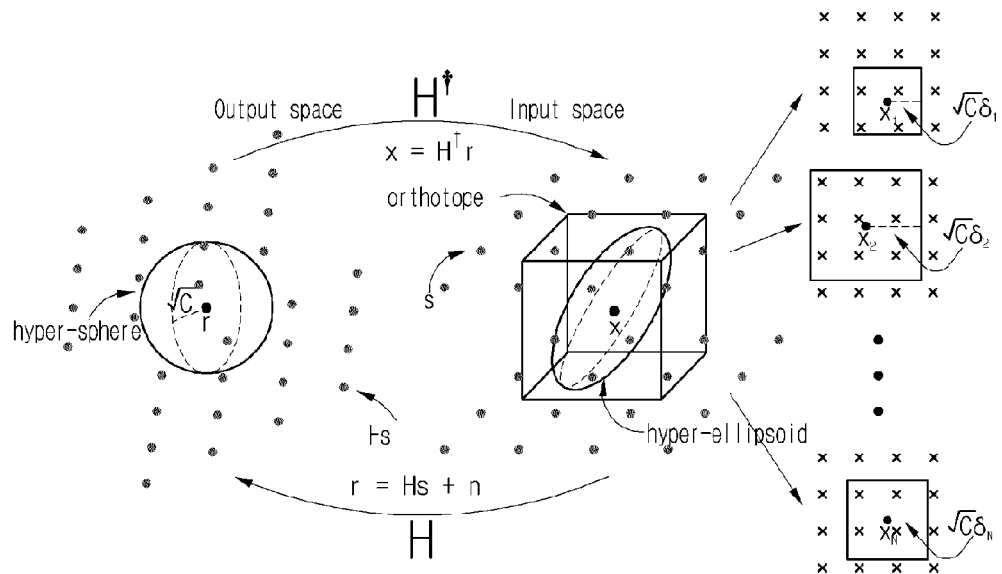
FIG. 2 is a view showing an input space and an output space for orthotope sphere decoding in accordance with one embodiment of the present invention.

FIG. 2 is a view showing an input space and an output space for orthotope sphere decoding according to the embodiment of the present invention. Each of the symbols in the figure represents a 16-QAM constellation point.

When the number of antennas of the receiver 20 is M and the number of antennas of the transmitter 10 is N in the multiple antenna system, a channel model of the multiple antenna system can be expressed as follows:

$$r = Hs + n,$$

wherein $$r = [r_1, \ldots, r_M]^T$$

denotes received signals. H denotes an M×N block Rayleigh fading channel matrix. Each entry of H is a Gaussian distributed random variable of an IID (independently and identically distributed) complex number control-mean unit. Here, the channel matrix is a value provided by the receiver 20.

$$s = [s_1, \ldots, s_N]^T$$

denotes symbol vectors transmitted from the transmitter 10 and satisfies $s \in \mathcal{O}^N \subset \mathbb{C}^N$. Here, $\mathcal{O}$ denotes constellation points of a signal in complex number domain $\mathbb{C}$.

$$n = [n_1, \ldots, n_M]^T$$

denotes AWGN (additive white Gaussian noise) vectors and has mean zero and variance $\sigma^2$.

The orthotope sphere decoder according to the embodiment is applied to lattice Hs ($s \in \mathcal{O}^N \subset \mathbb{C}^N$) having a complex number.

$H(k,:)$ denotes the k-th row of matrix H. $H^\dagger$ denotes inverse numbers of matrix H. Each component of the vector is written in subscript. For example, $S_k$ denotes the k-th component of vector S. $\bar{\mathcal{O}}$ denotes cardinality of set $\mathcal{O}$. $\|S\|$ denotes the second norm of vector S. $\mathbb{C}$ denotes a complex number domain.

In orthotope sphere decoding, additional constraints are applied to sphere decoding. A tree search is performed in sphere decoding. QR decomposition is performed on matrix H in sphere decoding. The sphere decoding does not calculate a full Euclidean distance and examines whether constellation points are within a certain sphere radius $\sqrt{C}$ using a partial matrix. These conditions are referred to as sphere constraints (SCs) and can be expressed as follows:

$$d_k = \sum_{i=k}^{N} |q_i|^2 \leq C,$$

wherein $d_k$ denotes a square root of a partial Euclidean distance at the k-th level ($1 \leq k \leq N$). $q_i$ denotes the i-th component of $q = R(x-s)$. At this point, R denotes the upper triangular matrix in QR decomposition of matrix H.

The concept of the orthotope can be specified through parameters of orthotope square width (OSW). The orthotope can be specified as a collection of center points $$x = [w_1, w_2, \ldots, w_N]^T$$

and widths of spaces $$w = [w_1, w_2, \ldots, w_N]^T$$

restricting the orthotope. The concept of the orthotope is extended to the complex plane so as to explain each dimension of the orthotope using the complex plane instead of the spaces. Accordingly, two space widths can be used for real and imaginary numbers in order to restrict each complex plane of the orthotope.

$$H := \{c | \, \Re(c_i - x_i)| \leq w_i, |\Im(c_i - x_i)| \leq w_i, c_i \in \mathbb{C}, w_i \in \mathbb{R} \, 1 \leq i \leq N\}$$

Each dimension of the orthotope is a square.

The orthotope square width (OSW) can be expressed as $\delta_1, \delta_2, \ldots, \delta_N (\delta_k = \|H^\dagger(k,:)\|)$ and is proportional to the widths of the orthotope squares. The widths of the orthotope squares are OSWs and maintain the same relative proportionality. This is referred to as an OSW constraint.

An O-metric can be used to examine whether constellation point $S_k$ is inside the orthotope. The O-metric is obtained by measuring how far a constellation point is positioned from the center of a pertinent orthotope square $X_k$. O-metric $\Delta(s_k)$ of a candidate constellation point $S_k$ is a minimum square width containing the constellation point within the boundary thereof and can be expressed as the following equation:

$$\Delta(s_k) = \max\{|\Re(s_k) - \Re(x_k)|, |\Im(s_k) - \Im(x_k)|\},$$

wherein $\Re(s_k)$ is the real number part of $S_k$, and $\Im(s_k)$ is the imaginary number part Of $S_k$.

If the O-metric of a certain constellation point $s_k$ is smaller than the k-th orthotope square width, the constellation point is inside the orthotope. This is referred to as an orthotope constraint (OC) and can be expressed as the following equation.

$$\Delta(s_k) \leq \sqrt{C} \cdot \delta_k \text{ for } k=1, \ldots, N$$

Figure 3:
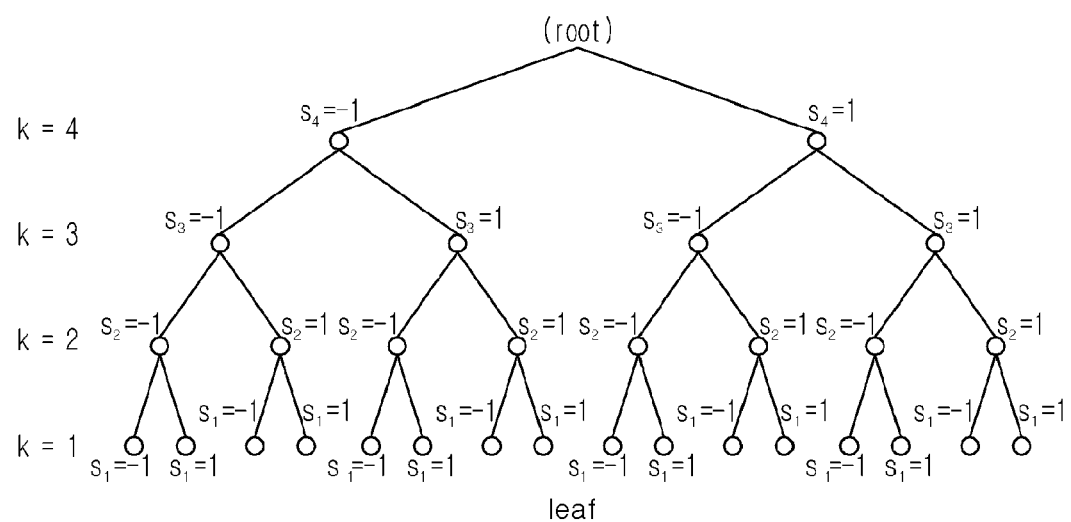
FIG. 3 is a view of a tree structure used for tree search in orthotope sphere decoding in accordance with one embodiment of the present invention.

FIG. 3 is a view of a tree structure used for tree search in orthotope sphere decoding in accordance with one embodiment of the present invention.

Referring to FIG. 3, a BPSK modulation scheme used in the multiple antenna system having four antennas is described as an example. The four antennas configure four levels in a tree.

The orthotope sphere decoder 200 in accordance with one embodiment performs tree search on a tree which has nodes corresponding to transmission symbols. Leaves of the tree represent all candidate symbol vectors that can be mapped to the tree.

The orthotope sphere decoder 200 performs tree search by visiting the nodes on a path to a leaf node from a root of a tree in the depth-first method.

The orthotope sphere decoder 200 detects transmission symbols by performing an OC-test or an SC-test on each node in the process of searching the tree.

At this point, if an orthotope is smaller than the minimum orthotope set by performing the OC-test or the SC-test, the search is not continued below the corresponding node, and the search flow moves to an upper level. If the search is not continued to subordinate nodes, this is referred to as pruning. In order to perform the OC-test or the SC-test, an O-metric or a PED should be calculated at each node.

A PED is calculated at each node to perform the SC-test while visiting the node. If a node does not pass the SC-test, leaves of the node cannot pass the SC-test. Accordingly, the nodes subordinate to the corresponding nodes are pruned from the tree.

The PED calculation needed for performing the SC-test is the most complex operation while the sphere decoding search is performed. PED calculation at the k-th level of the tree requires $8(N-k)+11$ floating-point operations ($1 \leq k \leq N$). If some of the PED calculation floating-point operations can be removed, complexity of sphere decoding can be reduced.

The orthotope sphere decoder 200 in accordance with one embodiment performs optimum tree search in order to reduce the burden of calculating the O-metric or the PED at each node when tree search is performed.

To this end, the orthotope sphere decoder 200 performs an OC (orthotope constraint) test before performing an SC-test. The OC-test determines whether a certain node is inside an orthotope sphere. If the certain node does not pass the OC-test, the node can be pruned without performing the SC-test. If a certain path does not pass the OC-test, constellation points thereof are outside the orthotope sphere. Here, operation of the OC-test is very simple compared with that of the SC-test because the orthotope sphere is hyper-rectangular. One OC-test requires only four floating-point operations. Accordingly, the OC-test of the orthotope sphere decoding in accordance with one embodiment of the present invention may reduce sphere decoding complexity.

The orthotope sphere decoder 200 searches a tree using the depth-first method. Accordingly, the orthotope sphere decoder 200 always moves downward starting from the root of the tree if there is a node satisfying the OC and the SC. Here, the SC-test is performed only when the OC-test is passed. The constrained width of the orthotope sphere and the constrained radius of the hyper-sphere are maintained while the OC-test and the SC-test are performed. The width of the orthotope sphere and the radius of the hyper-sphere start from $\sqrt{C_0} \cdot \delta_k$ and $\sqrt{C_0}$ and are updated whenever the tree search arrives at a leaf node. The radius is reduced to $\sqrt{d_1}$, which is a PED value of the leaf node, and the width of the orthotope sphere is reduced to $\sqrt{d_1} \cdot \delta_k$. The tree search is continued for remaining unvisited subordinate trees using the updated constraints. Once the tree search is finished, the leaf node visited in the latest update becomes the final value.

An O-metric, which is the k-th width of the orthotope sphere, may be calculated for each constellation point of a child node of $S_k$ of $s_{k+1}$. A child node $S_k$ inside a further smaller orthotope sphere is highly likely to be inside a further smaller hyper-sphere. Accordingly, the O-metric can be used as an alternative to a PED-metric.

In the orthotope sphere decoding in accordance with one embodiment of the invention, an O-metric of a child node may be calculated as $\Delta^2(s_k)$. Particularly, some child nodes may have the same O-metric value at a constellation point such as a QAM signal constellation point. Next, these nodes can be grouped according to the O-metric value. A group having a smallest O-metric is visited first. Once a group is visited, a PED is calculated for all members of the group. Then, a member having a smallest PED ($d_k$) is visited first within a corresponding group. This requests calculation of a PED only for the members of the current group. While the search is performed for all the member of the current group, the radius may be reduced whenever the search arrives at a leaf node. Update of the radius may be set stricter than that of the OC-test to provide a chance for completely removing the current and remaining groups. Thus, unnecessary PED calculations can be avoided. If the OC is not sufficiently strict, the search is continued for remaining child nodes in a method of searching a group having a smaller O-metric value first.

Figure 4:
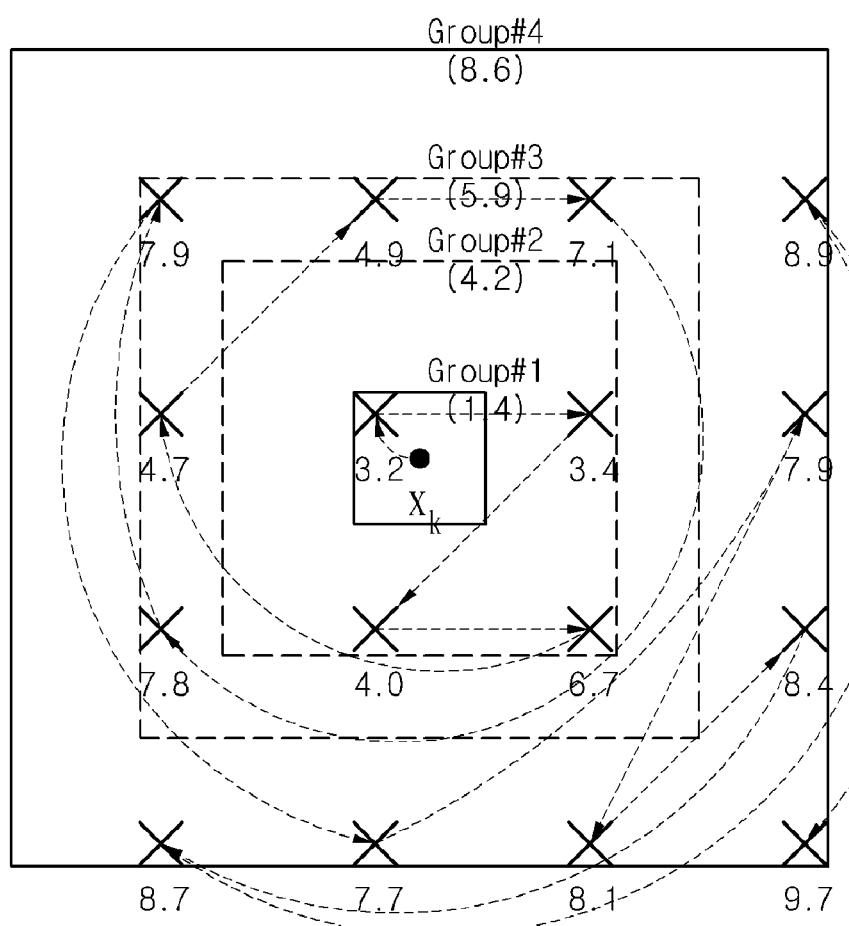
FIG. 4 is a view of a method of performing tree search by an orthotope sphere decoder in accordance with one embodiment of the present invention.

FIG. 4 is a view of a method of performing tree search by an orthotope sphere decoder in accordance with one embodiment of the present invention.

Here, constellation points for 16-QAM modulation are used. Positive O-metrics and PEDs of the constellation points are provided. Numerals in parentheses are O-metrics, and numerals outside the parentheses are PEDs. As shown in the figure, there are four groups. The groups contain one, three, five and seven constellation points, respectively. Members belonging to a group have the same O-metric. The tree search starts from a group having a smallest O-metric, i.e., the group having only one constellation point in the innermost square, and is continued to further larger O-metrics, i.e., constellation points in the outer squares. First, a PED is calculated for the constellation point members inside a group. The PED for the constellation point in a first group is calculated as 3.2. After the tree search is finished for the subordinate trees belonging to this group, the tree search moves to a second group having three constellation points. Then, PED calculation is performed for the members in the second group. The tree search is performed in order of increasing PED.

The tree search repeats this procedure for the remaining groups.

Although FIG. 4 shows all the PEDs, PED calculation does not need to be performed for all constellation points. For example, if the k-th width of the orthotope sphere square $\sqrt{C} \cdot \delta_k$ is reduced to a value smaller than 5.9 while the search is performed for the second group, a third group does not need to be searched. By reducing the number of PED calculations, enumeration overhead is reduced compared with enumeration of general sphere decoding.

Figure 5:
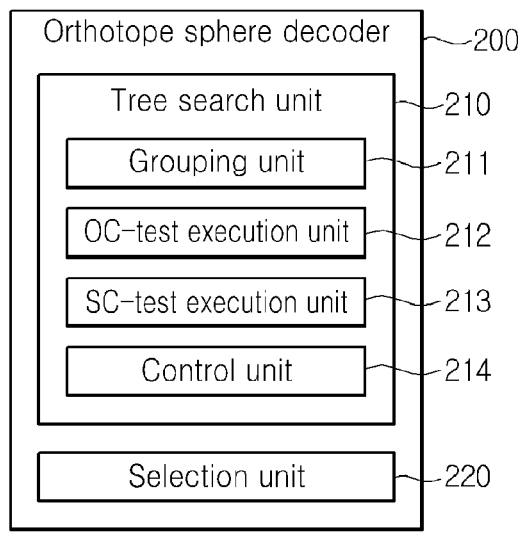
FIG. 5 is a view of an orthotope sphere decoder for signal reconstruction of a multiple antenna system in accordance with one embodiment of the present invention.

FIG. 5 is a view of an orthotope sphere decoder for signal reconstruction of a multiple antenna system in accordance with one embodiment of the present invention.

Referring to FIG. 5, the sphere decoder 200 of a multiple antenna system in accordance with one embodiment of the present invention includes a tree search unit 210 and a selection unit 220.

The tree search unit 210 performs tree search of orthotope sphere decoding for the nodes of a tree. The selection unit 220 selects a transmission symbol having a smallest PED value from a result of the tree search of the tree search unit 210 and outputs the transmission symbol as a final signal.

The tree search unit 210 performs tree search in the depth-first method by performing an OC-test on the nodes on which the tree search of orthotope sphere decoding will be performed and performing an SC-test on the nodes passing the OC-test.

The tree search unit 210 may perform the tree search by performing pruning through the OC-test before performing the SC-test.

The tree search unit 210 searches a group having a smaller O-metric value first among the nodes on which the tree search will be performed. The tree search unit 210 searches a node having a smaller PED value first among the nodes in the group having a smaller O-metric.

To this end, the tree search unit 210 may be configured to include a grouping unit 211, an OC-test execution unit 212, an SC-test execution unit 213 and a control unit 214.

The grouping unit 211 divides child nodes into groups according to the O-metric value of each child node of a node determined as a target of the tree search.

The OC-test execution unit 212 calculates an O-metric value of each child node of a node determined as a target of the tree search and performs an OC-test for pruning. The OC-test determines whether a certain node is located inside an orthotope sphere.

The OC-test may determine that an O-metrics of a certain node is located inside a smallest orthotope sphere with respect to a constellation point satisfying the following test.

The SC-test execution unit 213 calculates a PED value of each child node of a node determined as a target of the tree search and performs an SC-test for pruning.

The control unit 214 selects a group having a smallest O-metric value, which is selected by the grouping unit 211, as a tree search group of top priority.

The control unit 214 controls the SC-test execution unit 213 to calculate a PED value for the nodes belonging to the group selected as a tree search group of top priority.

The control unit 214 performs tree search starting from a node having a smallest PED value based on the PED value of each node calculated by the SC-test execution unit 213 for the nodes of the group selected as a tree search group of top priority.

Once tree search is finished for the nodes in the group selected as a tree search group of top priority, the control unit 214 performs tree search for the nodes in a group selected as a group of next priority.

The constrained width of the orthotope sphere and the constrained radius of the hyper-sphere for performing the OC-test and the SC-test are maintained until the tree search arrives at a leaf node from a root node and updated with a new value whenever the tree search arrives at the leaf node.

Figure 6:
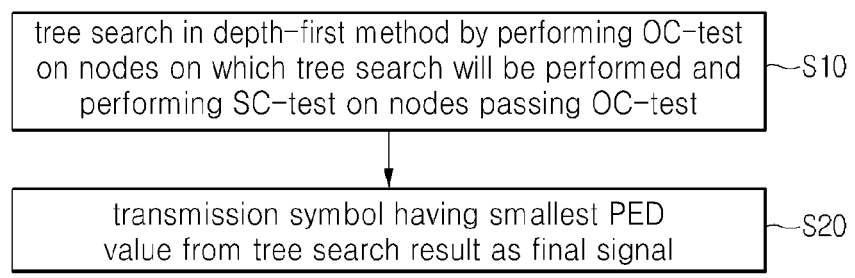
FIG. 6 is a flowchart of an orthotope sphere decoding method in accordance with one embodiment of the present invention.

FIG. 6 is a flowchart of an orthotope sphere decoding method in accordance with one embodiment of the present invention.

Referring to FIG. 6, in S10 of the orthotope sphere decoding method according to one embodiment, the tree search unit 210 performs tree search using the depth-first method by performing an OC-test on the nodes on which the tree search of orthotope sphere decoding will be performed and performing an SC-test on nodes passing the OC-test.

In S10, the tree search unit 210 searches a group having a smaller O-metric value first among the nodes on which the tree search will be performed and searches a node having a smaller PED value first among the nodes in the group having a smaller O-metric.

In S20, the selection unit 220 selects a transmission symbol having a smallest value as a final signal from a tree search result of the tree search unit 210.

Figure 7:
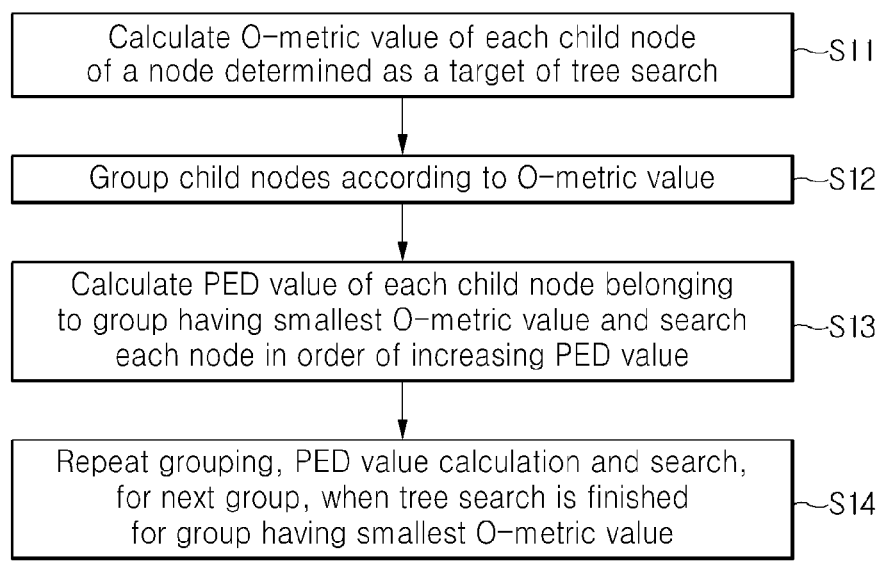
FIG. 7 is a flowchart of tree search in an orthotope sphere decoding method in accordance with one embodiment of the present invention.

FIG. 7 is a flowchart of tree search in an orthotope sphere decoding method in accordance with one embodiment of the present invention.

Referring to FIG. 7, in S11, the OC-test execution unit 212 calculates an O-metric value of each child node of a node determined as a target of the tree search.

In S12, the grouping unit 211 divides child nodes into groups according to the O-metric value of each child node of a node determined as a target of the tree search.

In S13, the control unit 214 calculates a PED value of each child node belonging to a group having a smallest O-metric value in the first place and searches each node in order of increasing PED value.

In S14, when the tree search is finished for the group having a smallest O-metric value, the control unit 214 continues the tree search for a group of next priority in the depth-first method by repeating grouping according to the O-metric value, calculating a PED value and performing the tree search.

Although some exemplary embodiments have been described herein, it should be understood by those skilled in the art that these embodiments are given by way of illustration only, and that various modifications, variations and alterations can be made without departing from the spirit and scope of the invention. The scope of the present invention should be defined by the appended claims and equivalents thereof.

What is claimed is:

1. An orthotope sphere decoding method of a multiple antenna system, the method comprising:
performing tree search using a depth-first method by performing an OC-test on nodes on which the tree search of orthotope sphere decoding will be performed and performing an SC-test on nodes passing the OC-test; and
selecting a transmission symbol having a smallest Partial Euclidean Distance (PED) value as a final signal as a result of the search, wherein
the OC-test checks whether $$\Delta(s_k) \leq \sqrt{C} \cdot \delta_k \quad \text{for } k = 1, \ldots, N,$$

where $S_k$ is a k-th component of vector S of a node, and C is a constant, and wherein
the SC-test checks whether $$d_k = \sum_{i=k}^{N} |q_1|^2 \leq C,$$

where $d_k$ is a square root of the PED at the k-th level ($1 \leq k \leq N$), $q_i$ is the i-th component of $q = R(x-s)$, and R is an upper triangular matrix in QR decomposition of a matrix H.

2. The orthotope sphere decoding method according to claim 1, wherein, in performing tree search, a group having a smaller O-metric value is first searched among the nodes on which the tree search will be performed and a node having a smaller PED value is first searched among the nodes in the group having a smaller O-metric value, and wherein a O-metric value ($\Delta(s_k)$) is obtained by $$\Delta(s_k) = \max\{\Re_{(s_k)} - \Re_{(x_k)} |, |\Im_{(s_k)} - \Im_{(x_k)}|\},$$

where $X_i$ is a pertinent orthotope square, $\Re_{(s_k)}$ is real number part of $S_k$, $\Im_{(s_k)}$ is imaginary number part of $S_k$, $\Re_{(x_k)}$ is real number part of $X_k$, and $\Im_{(x_k)}$ is imaginary number part of $X_k$.

3. The orthotope sphere decoding method according to claim 2, wherein the performing tree search comprises:
calculating an O-metric value of each child node of a node determined as a target of the tree search and grouping the child nodes according to the O-metric value;
calculating a PED value of each child node belonging to a group having a smallest O-metric value and searching each node in order of increasing PED value; and
continuing the tree search for a group of next priority in the depth-first method by repeating the grouping according to the O-metric value, calculating a PED value and performing the tree search.

4. The orthotope sphere decoding method according to claim 3, wherein the OC-test is a test to determine whether a certain node is inside an orthotope sphere.

5. The orthotope sphere decoding method according to claim 1, wherein a constrained width of an orthotope sphere and a constrained radius of a hyper-sphere for performing the OC-test and the SC-test are maintained until the tree search arrives at a leaf node from a root node, and are updated with new values whenever the tree search arrives at the leaf node.

6. An orthotope sphere decoding apparatus of a multiple antenna system, the apparatus comprising:
a tree search unit configured to perform tree search using a depth-first method by performing an OC-test on nodes on which the tree search of orthotope sphere decoding will be performed and performing an SC-test on nodes passing the OC-test; and a selection unit configured to select a transmission symbol having a smallest Partial Euclidean Distance (PED value as a final signal as a result of the search, wherein
the OC-test is configured to check whether $$\Delta(s_k) \leq \sqrt{C} \cdot \delta_k \quad \text{for } k = 1, \ldots, N,$$

where $S_k$ is a k-th component of vector S of a node, and C is a constant, and wherein
the SC-test is configured to check whether $$d_k = \sum_{i=k}^{N} |q_1|^2 \leq C,$$

where $d_k$ is a square root of the PED at the k-th level ($1 \leq k \leq N$), $q_i$ is the i-th component of $q = R(x-s)$, and R is an upper triangular matrix in QR decomposition of a matrix H.

7. The orthotope sphere decoding apparatus according to claim 6, wherein the tree search unit is configured to search a group having a smaller O-metric value first among the nodes on which the tree search will be performed, and search a node having a smaller PED value first among the nodes in the group having a smaller O-metric value, and wherein a O-metric value ($\Delta(s_k)$) is obtained by $$\Delta(s_k) = \max\{\Re_{(s_k)} - \Re_{(x_k)} |, |\Im_{(s_k)} - \Im_{(x_k)}|\},$$

where $X_k$ is a pertinent orthotope square, $\Re_{(s_k)}$ is real number part of $S_k$, $\Im_{(s_k)}$ is imaginary number part of $S_k$, $\Re_{(x_k)}$ is real number part of $X_k$, and $\Im_{(x_k)}$ is imaginary number part of $X_k$.

8. The orthotope sphere decoding apparatus according to claim 6, wherein the tree search unit includes:
a grouping unit configured to group child nodes according to an O-metric value of each child node of a node determined as a target of the tree search;
an OC-test execution unit configured to calculate the O-metric value;
an SC-test execution unit configured to calculate a PED value; and
a control unit configured to perform the tree search using the depth-first method, by
controlling the grouping unit, the OC-test execution unit and the SC-test execution unit to calculate a PED value of each child node belonging to a group having a smallest O-metric value, search each node in order of increasing PED value and repeat the grouping according to the O-metric value,
calculating a PED value, and
performing the tree search for a group of next priority.

9. The orthotope sphere decoding apparatus according to claim 6, wherein the OC-test is a test to determine whether a certain node is inside an orthotope sphere.

10. The orthotope sphere decoding apparatus according to claim 6, wherein a constrained width of an orthotope sphere and a constrained radius of a hyper-sphere for performing the OC-test and the SC-test are maintained until the tree search arrives at a leaf node from a root node, and are updated with new values whenever the tree search arrives at the leaf node.

* * * * *